United States Patent [19]

Yasuda

[11] Patent Number: 5,433,860

[45] Date of Patent: Jul. 18, 1995

[54] PROCESS FOR TREATING WASTE WASHING WATER USED FOR IMPREGNATION

[75] Inventor: Tohru Yasuda, Michida, Japan

[73] Assignee: Loctite Corporation, Hartford, Conn.

[21] Appl. No.: 122,478

[22] PCT Filed: Mar. 27, 1992

[86] PCT No.: PCT/JP92/00380

§ 371 Date: Jan. 12, 1994

§ 102(e) Date: Jan. 12, 1994

[87] PCT Pub. No.: WO92/17408

PCT Pub. Date: Oct. 15, 1992

[30] Foreign Application Priority Data

Mar. 27, 1991 [JP] Japan ............................. 3-087836

[51] Int. Cl.$^6$ ............................................. B01D 61/14
[52] U.S. Cl. .................................... 210/651; 210/500.41
[58] Field of Search ................ 210/650, 651, 652, 767, 210/734, 737, 748, 908, 500.41

[56] References Cited

U.S. PATENT DOCUMENTS 4,865,742 12/1989 Falletti .
5,273,662 12/1993 Muiseher et al. ................... 210/734

FOREIGN PATENT DOCUMENTS 0254550 1/1988 European Pat. Off. .
0332788 9/1989 European Pat. Off. .

Primary Examiner—Frank Spear
Attorney, Agent, or Firm—Edward K. Welch, II; Eugene F. Miller

[57] ABSTRACT

A process for treating waste washing water, which is only slightly affected by temperature, can dispense with any chemical, and wherein the quality of treated water is not affected by a change in the waste water concentration. The process comprises conducting impregnation with an impregnant having a composition comprising triethylene glycol dimethacrylate, 2-hydroxyethyl methacrylate, lauryl methacrylate, nonionic surfactant and azobisisobutyronitrile; separating the impregnant thereafter; washing the surface of the impregnated article with water; and treating the waste water by filtering the liquid having the above composition though a filter having a retained particle diameter of at most 20 μm.

11 Claims, No Drawings

PROCESS FOR TREATING WASTE WASHING WATER USED FOR IMPREGNATION

TECHNICAL FIELD

This invention relates to a method for the treatment of the effluent from the washing with water of an impregnated object, which method accomplishes the treatment without specially requiring addition of a chemical agent.

BACKGROUND ART

The practice of using a liquid impregnant such as sodium silicate or an unsaturated polyester or an aerophobic liquid impregnant for the purpose of infallibly sealing invisible pinholes in die-cast products and cast products of aluminum, zinc, and other metals; completely filling and sealing pores in sintered metal parts; preventing plated products from blowing by subjecting the parts to the treatment of impregnation before the step of plating; and sealing minute pores in porous nonmetallic parts such as wood and ceramics has been in vogue.

For example, the impregnation of a given part is attained by: degreasing and cleaning the part; subjecting the cleaned part to vacuum aspiration in a vacuum tank, thereby removing entrapped air from the minute pores in the part; immersing the part in a bath of an organic liquid impregnant such as an aerophobic resin; maintaining the part in a vacuum; and subsequently exposing the immersed part to the atmospheric pressure, thereby causing the liquid impregnant to permeate the minute pores. In this case, the impregnation can be enhanced by supplying compressed air to the site of impregnation. Then, the liquid impregnant is returned to the reservoir and the part which has undergone the impregnation is centrifuged to expel the liquid impregnant adhering to the surface of the part. Thereafter, the part is cleaned with a detergent to remove the liquid impregnant still remaining on the surface of the part or in the tapped holes. The treatment of impregnation is finished by subjecting the part to a treatment for curing.

In this treatment of impregnation, the effluent to be discharged from the site of treatment is the spent detergent which results when the liquid impregnant, remaining only slightly on the surface of the part which has undergone the treatment of impregnation, is washed off with a detergent. Heretofore, organic solvents such as trichloroethane and fluorinated hydrocarbon have been used as detergents. On account of the anxiety about the environment and the concern about cost, the use of such organic detergents has been giving place to the use of water for the cleaning. In consequence of this trend, there has arisen the necessity for separating and recovering the liquid impregnant contained in the effluent before the effluent is discarded from the plant. This separation of the liquid impregnant from the effluent is a difficult matter.

For the treatment of the effluent of this nature, the following methods have been available to date.

(1) Method of adsorption: The liquid impregnant which is an organic substance is removed by adsorption using an adsorbent such as activated carbon. By this treatment, both the BOD and COD contents in the effluent can be lowered to below several ppm. Thus, this method may well be called a method for final treatment productive of an effluent tolerable for release into rivers. (2) Method of microorganic decomposition: This method, represented by the version resorting to the action of activated sludge, allows the same degree of treatment as the method of adsorption by the decomposition of organic matter with aerobic bacteria. (3) Method of combustion: The effluent is dispersed in heavy oil and the resultant mixture is burnt by spraying into a flame. Since this combustion produces carbon dioxide gas and water, this method effects perfect detoxification of the effluent. (4) Method of thermal polymerization: This method utilizes the phenomenon that an impregnant polymerized in water is insoluble in water. Generally, the water containing the impregnant is heated for the purpose of promoting the reaction. The treated effluent is subjected to solid-liquid separation by filtration or settling (difference in specific gravity). The treated effluent has a COD content of from some thousand to some tens of thousand ppm and, therefore, is generally not allowed to be released into rivers. It is, either subjected to another final treatment or reclaimed as washing water. (5) Method of separation by flocculation: This method, primarily intended for the removal of suspended matter from water, is capable of causing incorporation of a water-soluble liquid impregnant in the product of flocculation. The treated effluent is substantially equal in quality to that obtained by the method of thermal polymerization.

The methods of (1) and (2) are both classical ways of waste water disposal and may well be called common techniques. Their execution, however, entails a space and cost for installation of apparatus for impregnation. The exclusive use of these methods as means for impregnation is not practically feasible, with the running cost as a contributory factor. The method of combustion of (3) operates with a relatively simple apparatus and relies on treatment simply on the phenomenon of combustion, and may well be called a method of popular use. The largest problem confronting this method is the fact that the vaporization of water, which accounts for most (about 90%) of the effluent, consumes a large volume of energy, and the expense of fuel for the vaporization brings a huge addition to the running cost. The method of (4) utilizes the reactivity of the impregnant and enjoys popular acceptance next to the method of (3). This method, however, necessitates numerous auxiliary devices such as devices for injection of a flocculating auxiliary and a pH adjusting agent, a reaction tank, a separation tank, and a device for cooling the treated effluent, for example. Moreover, the by-product of the reaction defies elucidation and control. These factors, coupled with the cost of energy for heating and cooling, prevent this method from being disseminated. The method of flocculation of (5) necessitates the same apparatus as the method of (4), except it does not use the devices used in method (4) for heating and cooling. Since the floc produced by this method has low strength, the liquid impregnant contained in the floc redisperses when the speed of filtration for separation is heightened, and the load exerted on the device for filtration increases when the speed of filtration is slowed.

The conventional methods of treatment, except for the method of thermal polymerization utilizing the reactivity of the liquid impregnant, turn out to be those generally employed for the disposal of other industrial effluents. Since the polymerization hinges heavily on temperature, the method of thermal polymerization calls for a device for temperature control and a device for cooling the treated effluent for reclamation. The other conventional methods are not satisfactory measures for the treatment of the effluent emanating from the apparatus of impregnation for the reasons given above. Thus, the desirability of developing a method of an entirely novel concept which provides a highly efficient and economically advantageous treatment of the effluent under discussion has been finding enthusiastic recognition.

An object of this invention is to provide a method for the treatment of the effluent resulting from the process of detergency, the method being affected by temperature only to a small extent, the method requiring no addition of a chemical agent, and the method producing a treated water which is not affected by a change in the effluent concentration.

DISCLOSURE OF INVENTION

The present inventor has conducted a study with the intent of solving the problems mentioned above and fulfilling the object mentioned above, to find that the effluent can be adapted to undergo precision filtration for highly effective separation by using a liquid impregnant containing a water-insoluble monomer in an increased concentration, thereby converting the effluent from the solution incorporating therein the liquid impregnant subjected to separation on the molecular level, to a dispersion having incorporated therein from several to some hundred or more monomers associated in the form of micelles (oil drops). He has perfected this invention as a result. To be specific, this invention concerns a method for the treatment of the effluent resulting from the washing with water of an impregnated object produced by the treatment of impregnation using an organic impregnating agent having as a main component thereof an acrylic type or methacrylic type monomer containing at least 30% of a crosslinking agent or a water-insoluble monomer, which method is characterized by effecting the treatment of the effluent by the treatment of filtration using a filter medium having an average retained particle diameter of at most 20 μm.

The effluent from the treatment of impregnation which is involved in the present invention results from the treatment of impregnation using an organic liquid impregnant having as a main component thereof an acrylic or methacrylic type monomer containing at least 30% of a cross-linking agent or a water-insoluble monomer. As an example of the cross-linking agent, a sparingly water-soluble cross-linking agent such as triethylene glycol dimethacrylate may be cited. As examples of the water insoluble monomer, lauryl methacrylate and slightly water-soluble 2-hydroxy methacrylate may be cited. The lower limit of 30% is fixed for the content of the cross-linking agent or the water-insoluble monomer because the necessity arises for notably lowering the retained particle diameter. The material for the filter medium is restricted, and the efficiency of separation is seriously degraded when the soluble monomer is otherwise contained in a large amount. The acrylic or methacrylic type monomers which are useful herein include trimethylol propane tri(meth)acrylates, 1,6-hexane di(meth)acrylates, neopentyl glycol di(meth)acrylates, polyethylene glycol di(meth)acrylates, 2-hydroxyethyl (meth)acrylates, and methoxypolyethylene glycol mono(meth)acrylates, for example.

At the time of treatment, the concentration of the effluent which results from the treatment for impregnation using the liquid impregnant, is altered by the regulation of the speed of filtration and, by nature, has no particularly suitable level. It may be suitably fixed in due respect of the economy and efficiency of the treatment with relation to the device used for the treatment of impregnation.

The filter medium is selected from among such substances as cellulose, tetrafluoroethylene, polysulfone, aromatic polyamides, glass fibers, alumina, and titanium dioxide, which have average retained particle diameters of at most 20 μm, in due consideration of the state and degree of concentration of the effluent and durability of the filter medium. In terms of resistance to chemicals, tetrafluoroethylene, glass fibers, alumina, and titanium dioxide prove to be particularly suitable. An inorganic membrane permits easy use from the viewpoint of the treatment for regeneration.

For example, an alumina type filter medium is formed by boring a plurality of pores in a cylindrical support of coarse particles, wherein the inner surface of each of the pores is lined with a film of fine particles.

The upper limit of 20 μm is fixed for the average retained particle diameter because the exclusive use of the liquid impregnant suffices for the treatment of the effluent and does not entail use of a special flocculation aid. When a flocculation aid is used, it allows a further addition to the coarseness of the filter medium fit for effective use in the treatment.

Though an elevation of the temperature of the effluent during the treatment of filtration is beneficial because it proportionately lowers the viscosity of water and increases the speed of filtration, the treatment of filtration can be carried out sufficiently at normal room temperature.

Separation by filtration is a technique which has long been used for the separation of a solid from a liquid. Also, in the field of waste water disposal, it is widely used in solid-liquid separations by the method of flocculation, and for prefiltering in a tank for adsorption with activated carbon. Recently, owing to advances in the filter medium, the technique of filtration is now capable of not merely effecting separation of an oil emulsion and solid-liquid separation due to desalination, but filtration is also effective for solid-liquid separation and molecular level separation.

If the liquid impregnant is set to have a pH level of 7–8, the value of which is necessary for washing the metal, it will not be necessary to adjust the pH.

The fact that a water-soluble monomer can be separated by precision filtration of this kind is theoretically understandable. In fact, a methacrylic acid type water-soluble monomer can be separated by the method of reverse osmosis filtration. The efficiency of this separation, however, is not fully satisfactory. When the concentration is carried out the level of 20 to 40%, the membrane used for this reverse osmosis filtration becomes vulnerable to chemicals and suffers from a notable decrease in service life. The solution to this problem necessitates development of a novel membrane for separation. Such a membrane also involves problems in terms of maintenance. Membrane separation, therefore, has appeared to be hardly feasible.

In the development of the present invention, it has been discovered that the filter medium is allowed to contain pores of a large diameter and use a material selected from a wide variety of materials. This is accomplished by heightening the water-insoluble monomer concentration, thus effecting conversion of the effluent from the solution incorporating therein the liquid impregnant for separation on the molecular level to the dispersion having from several to some hundred or more monomers incorporated therein associated in the form of micelles (oil drops). Generally, for the separation of a solution incorporating such monomers on the molecular level therein, reverse-osmosis filtration (RO) followed by ultrafiltration (UF) is partly used. For separation of the dispersion, UF with a filter membrane having a retained particle diameter ranging from several $\mu$m to some tens of $\mu$m is used. The enlargement of the retained particle diameter as accomplished by the present invention brings about the advantage of widening the spectrum of selection of the filter medium and facilitating measures to cope with the problem of chemical resistance and maintenance. At the same time, the amount of the effluent to be filtered per unit surface area tends to increase in proportion as the diameter for filtration increases. This increase in the amount of the effluent to be filtered greatly contributes to decreasing the size of a plant.

The study on the relation with the composition of the liquid impregnant has imparted great potential to the method of separation by filtration which has heretofor found a greatly limited utility. The extensive use of a water-insoluble monomer in the step devoted basically to the purification of water, however, incurs a serious drawback in terms of the ability of purification, and necessitates a technique for advanced utilization of a surfactant. This technical requirement has conversely urged perfection of a technique for utilizing the surfactant in alleviating the deteriorated permeation of the monomer through the membrane for separation.

BEST MODE FOR CARRYING OUT THE INVENTION

EXAMPLE

An aqueous solution containing 5% of suspended matter composed of 65 parts of triethylene glycol dimethacrylate, 19.7 parts of 2-hydroxyethyl methacrylate, 10 parts of lauryl methacrylate, 5 parts of nonionic surfactant, and 0.3 part of azobisisobutyronitrile was prepared and passed through a 0.1 $\mu$m PTFE membrane to collect the suspended matter on the membrane. The SS concentration, by determination of weight difference before and after the treatment of purification, was found to be 5992 mg/liter. Separation with a 0.1 $\mu$m alumina type filter produced a colorless, transparent liquid having a COD content of 9,700 mg/cg. This liquid was found to be fully utilizable as washing water. When this treatment was consecutively used for one week, the filter showed a gradual decrease in the amount of water permeated therethrough and, at the end of one week's use, showed a clogging of 10%. When the filter was regenerated by burning, it resumed the initial capacity for permeation. Thus, the regenerated filter was again usable for the treatment.

Comparative Experiment

An aqueous solution containing 5% of suspended matter comprised of 89 parts of 2-hydroxyethyl methacrylate, 10 parts of polyethylene glycol dimethacrylate, and 1 part of benzoyl peroxide was passed through a 0.1 $\mu$m-PTFE membrane to collect the suspended matter on the membrane. The SS concentration, by determination of the weight difference before and after the treatment for purification, was found to be nil.

Industrial Applicability

This invention consists of filtering with a filter medium having a specific average retained particle diameter, the effluent from the treatment for impregnation using a liquid impregnant containing a cross-linking agent for a water-insoluble monomer in a specific concentration. This filtration, therefore, yields only slightly to the effects of concentration and temperature of the effluent; obviates the necessity for adding any special chemical agent; does not require a large space and limits high expenses of equipment and fuel, which have been inevitable for the conventional treatment of effluent by impregnation; allows easy control of operation; and permits the treatment to be carried out inexpensively and infallibly. Thus, the present invention proves to be highly effective.

I claim:

1. A method of treating effluent waste water containing micelles of an impregnation resin for the purpose of removing said impregnation resin from the waste water, said impregnation resin comprising a (meth) acrylate monomer composition containing at least 30% of an agent selected from the group consisting of a cross-linking agent, a water-insoluble monomer and mixtures thereof and said micelles having been generated by the aqueous washing of an impregnated porous article to remove excess liquid impregnant from the article prior to curing of the resin, said method comprising the step of filtering the effluent waste water through a filter medium having a pore size of 20 $\mu$m or less, thereby trapping the micelles in the filter medium.

2. The method of claim 4 wherein the filter medium is an organic filter medium selected from the group consisting of cellulose, tetrafluoroethylene, polysulfone and aromatic polyamides.

3. The method of claim 4 wherein the filter medium is an inorganic filter medium selected from the group consisting of glass fiber, alumina and titanium dioxide.

4. The method of claim 3 wherein the inorganic filter medium is selected from the group consisting of alumina and titanium dioxide.

5. The method of claim 4 comprising the further step of burning the filter medium so it is regenerated.

6. The method of claim 1 wherein the (meth)acrylic monomer is selected from the group consisting of trimethylol propane tri(meth)acrylate, 1,6-hexane di(meth)acrylate, polyethylene glycol di(meth)acrylate, 2-hydroxyethyl (meth)acrylates and methoxypolyethylene glycol mono(meth) acrylates.

7. The method of claim 1 wherein the agent is a cross-linking agent.

8. The method of claim 7 wherein the cross-linking agent is triethylene glycol dimethacrylate.

9. The method of claim 1 wherein the agent is a water-insoluble monomer.

10. The method of claim 9 wherein the water-insoluble monomer is selected from the group consisting of lauryl methacrylate and 2-hydroxy methacrylate.

11. The method of claim 1 wherein the effluent is filtered throught the filter medium at an elevated temperature, thereby increasing the speed of filtration.

* * * * *

UNITED STATES PATENT AND TRADEMARK OFFICE
CERTIFICATE OF CORRECTION

PATENT NO. : 5,433,860
DATED : 18 July 1995
INVENTOR(S) : Tohru Yasuda

It is certified that error appears in the above-indentified patent and that said Letters Patent is hereby corrected as shown below:

Column 6, claim 2, line 35, delete "4" and insert -- 1 --.
Column 6, claim 3, line 39, delete "4" and insert -- 1 --.

Signed and Sealed this

Twelfth Day of September, 1995

Attest:

BRUCE LEHMAN

*Attesting Officer*    Commissioner of Patents and Trademarks